March 15, 1960 A. SHANOK ET AL 2,928,201
TRIM
Filed April 1, 1955

ABRAHAM SHANOK
VICTOR SHANOK
JESSE SHANOK
INVENTORS,

BY Abraham Friedman
Atty.

United States Patent Office 2,928,201
Patented Mar. 15, 1960

2,928,201

TRIM

Abraham Shanok, Victor Shanok, and Jesse Shanok, Brooklyn, N.Y.

Application April 1, 1955, Serial No. 498,607

2 Claims. (Cl. 41—10)

This invention relates to a decorative trim particularly adaptable for mounting upon a relatively thin projecting edge, lip, or the like.

It is the primary inventive object to provide a decorative moulding or trim which can be readily and securely mounted without special tools on a thin ledge or flange projecting from the surface of a vehicle, wall, ceiling, shelf, article of furniture or the like and which will blend pleasingly with the surrounding supporting structure.

Another inventive object is the provision of a decorative trim as indicated in the foregoing object which can be fabricated by an extrusion process providing strips of any desired length being longitudinally flexible and transversely resilient whereby the trim is capable of readily assuming the alignment of the supporting flange and of being deformed normally to the longitudinal for grasping the supporting flange.

A further inventive object involves the provision of a decorative trim which can be fabricated by an extrusion process in elongated flexible strips of any desired length and which can be subsequently transversely deformed to assume a cross-section which includes adjoining prongs biased together by the resiliency of the strip whereby the strip can be securely and readily mounted without special tools upon a lip, flange or other projecting supporting structure to be decorated.

A still further inventive object involves a decorative trim as in the last preceding object wherein the trim is further secured to the supporting flange, lip, etc. by the provision of an adhesive substance on the trim whereby the mounting of the trim upon the supporting structure flange brings the adhesive into contact with the supporting flange.

Further objects, benefits and advantages of this invention will become apparent from the description thereof contained in the annexed drawings, specifications and claims or as will otherwise become obvious. It will be understood that the invention herein disclosed may be employed for other purposes for which the parts, structure and arrangement are adapted.

Figure 1:
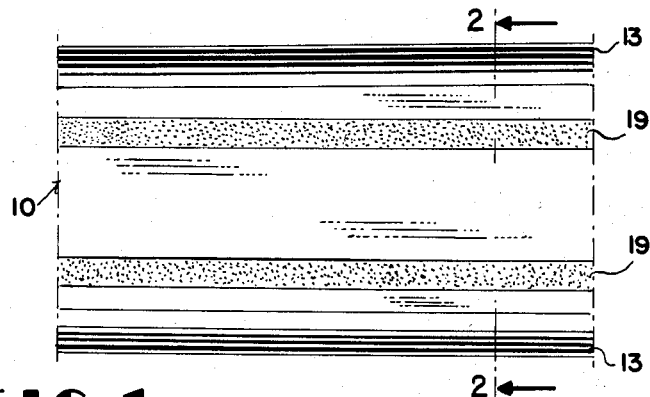
Figure 1 is an elevation of a section of the novel decorative trim prior to transverse deformation for mounting purposes.
Figure 2:
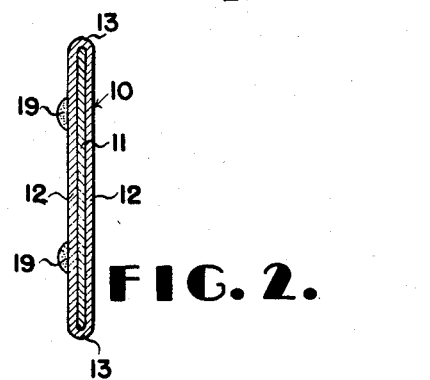
Figure 2 is a transverse section through plane 2—2 of Figure 1 showing the internal structure and the projecting strips of adhesive material secured along one side thereof.

Referring now to Figures 1 and 2, the decorative trim 10 is seen to comprise a flat thin strip of tape or ribbon 11 completely enclosed and encapsulated in a transparent shell of plastic material 12 having curvate closed edges 13. In practice, it has been found advantageous to extrude a transparent plastic material about a ribbon of aluminum foil forming a resiliently flexible continuous strip closely simulating the conventional chrome or stainless steel stripping used for decorative purposes in connection with vehicles or the like. It should be understood that ribbons or strips of other than aluminum and transparent materials other than synthetic resins can be used without departing from the inventive scope herein disclosed. The transparent outer material however must incorporate durability, longitudinal and transverse flexibility, electrical insulating qualities when required, water impermeability and the qualities required for the extrusion process. A synthetic resin suitable for the outer jacket is cellulose acetate butyrate.

The strip may be utilized in this form and mounted upon the desired support by conventional mounting means. It has however been found desirable to utilize the strip in the horseshoe-shape depicted in section in Figure 3 so as to achieve the advantages in mounting herein set forth. Thus, the trim of Figure 2 is deformable transversely to maintain the horseshoe section depicted in Figure 3. Any conventional means (not shown) for shaping the trim may be used. However, it has been found particularly advantageous to accomplish this deformation as the strip emerges from the die of an extrusion machine. As the strip emerges from the extruder the synthetic resin comprising the encapsulating material is in sufficiently plastic condition to permit the transverse shaping thereof to the horseshoe section desired without destroying the basic form. The plastic material utilized in addition to being deformable transversely in the manner indicated while in somewhat plastic condition, must additionally be capable of maintaining the horseshoe-shape thus imparted thereto resiliently and simultaneously to be rigid enough to resist external forces encountered in its functional environment.

Figure 3:
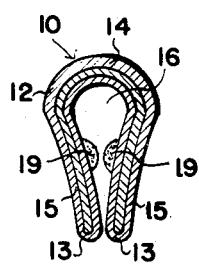
Figure 3 shows the section of Figure 2 transversely deformed to form a horseshoe-shaped section with the adhesive strips along the interior surface thereof ready for mounting.

The operative form of Figure 3 comprises an intermediate substantially semi-circular portion 14 having projecting arms 15 which are opposingly inclined towards each other. The space 16 separating the arms 15 varies from a maximum adjacent the semi-circular portion 14 to a substantially zero clearance at the ends 13. Due to the inherent resiliency of the arms 15 biasing the arms together, the insertion of an object into space 16 is laterally resisted.

Figure 4:
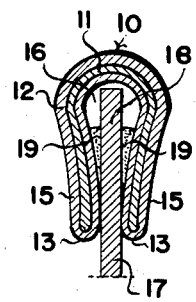
Figure 4 shows the section of Figure 3 mounted on a projecting flange which is inserted between the opposing legs of the horseshoe.

In Figure 4, the trim 10 is seen in operative position mounted on a flange, lip or other projecting structure 17 used for supporting the trim. By progressively forcing the trim upon the flange 17, the arms 15 are spread apart permitting the entry of the upper flange end 18 into the space 16. The resilient inward bias of arms 15 provide a frictional contact between the flange surfaces and the opposing surfaces of the arms 15 which adequately resists accidental removal therefrom. It should be also noted that the curvate edges 13 facilitate the insertion of the flange 17 into the space 16 and prevent damage to the encapsulating jacket 12. Since the greatest portion of the flange portion within space 16 is surrounded by an air layer in addition to the plastic jacket, an augmented insulation is interposed between the conductive ribbon 11 and the flange end 18. This additional insulation is pertinent where the trim functions dually as an antennae (not shown) whereby electronic short-circuiting is mitigated.

Although the frictional engagement between the flange 17 and the arms 15 is generally adequate to prevent accidental dislodging of the trim, the provision of symmetrically disposed longitudinal beads 19 along the inner surface of the trim formed of a tacky, deformable adhesive substance provides a more rigid interconnection between the trim and the flange 17. As is better seen in Figure 3, the beads 19 are oppositely disposed projecting into the portion of space 16 which is between the portion 14 and the ends 13. The space between the beads is smaller than the flange width, whereby flange insertion beyond the beads results in contact between the flange surfaces and the beads 19. The said contact deforms the beads and causes the tacky substance to flow between the flange 17 and the arms increasing the areas of contact. Consequently mutual adhesion between the flange surface, the substance and the arms 15 further prevents the removal of the flange from the space 16. The concerted action of the adhesive substance and the said frictional engagement virtually eliminate any possible accidental dislodging action.

Suitable adhesives for the formation of beads 19 are cellulose and polyvinyl butyral based adhesives although it should be understood that any substance which adheres to the flange 17 and the jacket 12 and which is readily deformable without alteration due to the passage of time can be used without departing from the spirit of this invention.

Although, a preferred embodiment is herein disclosed, it should be understood that, the invention is not so restricted since many changes, additions and modifications can be made without departing from the spirit and scope of the invention as herein disclosed and hereafter claimed.

Having disclosed the nature of the invention it is desired to secure by Letters Patent the following which is claimed as new and novel:

1. A decorative trim of U-shaped cross-section adapted to be mounted on a relatively thin flange projecting from a structure to be decorated, comprising an elongated strip of material deformable to conform to the flange profile and colored to blend aesthetically with the decorated structure, the said trim comprising in cross-section a pair of oppositely tapering arms resiliently biased together by the material properties, said arms being integrally joined by a curvate inner portion and in contact with each other at the ends remote from the said portion enclosing thereby an interior cone shaped space, in combination with a tacky deformable substance secured to one of said arms between the contacting ends and the said inner portion and lying within the said space whereby flange insertion between the arms spreads apart the arms to provide a grasping engagement with the arms and also results in adhering contact with the said tacky substance, providing a secure connection between the flange and the trim.

2. A trim as in claim 1 wherein the elongated strip of material further comprises an outer transparent jacket of plastic and an inner encapsulated ribbon of metallic foil simulating the appearance of "chrome" trimming.

References Cited in the file of this patent
UNITED STATES PATENTS

| | | |
|---|---|---|
| 1,170,197 | Styll et al. | Feb. 1, 1916 |
| 1,444,912 | Hammel | Feb. 13, 1923 |
| 1,707,515 | Evans | Apr. 2, 1929 |
| 1,778,726 | Pappert | Oct. 21, 1930 |
| 2,214,842 | Sweet et al. | Sept. 17, 1940 |
| 2,240,274 | Wade | Apr. 29, 1941 |
| 2,307,406 | Howard | Jan. 5, 1943 |
| 2,332,233 | Katz | Oct. 19, 1943 |
| 2,774,811 | Shanok et al. | Dec. 18, 1956 |

FOREIGN PATENTS

| | | |
|---|---|---|
| 346,910 | Great Britain | Apr. 23, 1931 |